(12) United States Patent
Igarashi et al.

(10) Patent No.: US 6,692,057 B2  
(45) Date of Patent: Feb. 17, 2004

(54) LATCH ATTACHMENT STRUCTURE

(75) Inventors: Kazuhiko Igarashi, Shizuoka (JP); Hiroyuki Imakama, Shizuoka (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 10/265,669

(22) Filed: Oct. 8, 2002

(65) Prior Publication Data

US 2003/0071481 A1 Apr. 17, 2003

(30) Foreign Application Priority Data

Oct. 12, 2001 (JP) .................................... 2001-314650

(51) Int. Cl.[7] ............................................. B62D 25/10
(52) U.S. Cl. ................... 296/76; 296/146.9; 296/146.6; 292/337; 292/DIG. 2; 70/418; 70/419
(58) Field of Search ............................... 296/76, 146.8, 296/146.9, 146.6; 74/608, 612; 292/337, DIG. 2; 70/416, 418, 419

(56) References Cited

U.S. PATENT DOCUMENTS

| | | | | |
|---|---|---|---|---|
| 3,047,326 A | * | 7/1962 | Leslie et al. ............ 292/341.15 |
| 3,113,447 A | * | 12/1963 | Oishei ..................... 70/262 |
| 3,964,208 A | * | 6/1976 | Renner et al. ............. 49/502 |
| 4,433,866 A | * | 2/1984 | Hagiwara ................... 296/76 |
| 5,211,436 A | * | 5/1993 | Feder ....................... 296/76 |
| 5,553,910 A | * | 9/1996 | Park ........................ 296/188 |
| 6,019,418 A | * | 2/2000 | Emerling et al. ......... 296/146.8 |
| 2002/0158487 A1 | * | 10/2002 | Gehringhoff et al. .... 296/146.6 |

FOREIGN PATENT DOCUMENTS

JP          57197379          12/1982

OTHER PUBLICATIONS

English Language Abstract of JP 57–197379.

* cited by examiner

Primary Examiner—Dennis H. Pedder  
Assistant Examiner—Patricia L. Engle  
(74) Attorney, Agent, or Firm—Greenblum & Bernstein, P.L.C.

(57) ABSTRACT

A trunk lid or back door of a vehicle includes an inner panel and an outer panel, and a gap is formed between the inner panel and the outer panels. A reinforcement member is provided outside the inner panel at a position corresponding to an attachment unit of a latch. An extending portion of the reinforcement member extends to the outer panel and is provided with an attachment portion which is fixed on the outer panel. The latch is provided inside the inner panel and a latch disengaging lever is attached to the latch at the outer side thereof in a rotatable manner. In addition, the extending portion of the reinforcement member is positioned directly above the latch disengaging member.

14 Claims, 6 Drawing Sheets

LATCH ATTACHMENT STRUCTURE

BACKGROUND OF THE INVENTION

1. Field of the Invention

The present invention relates to an attachment structure for a latch in a lock mechanism for maintaining a locked condition of a vehicle component, and more particularly, for an attachment structure for a latch in a lock mechanism of a trunk lid or a back door of a vehicle.

2. Description of the Related Art

FIG. 6 is a perspective view of a trunk lid used for opening and closing a trunk of a vehicle, and FIG. 7 is a sectional view of the trunk lid. In the drawings, directions shown by the arrows indicate directions toward the outside of the vehicle.

As shown in the figures, a trunk lid 51 is provided with a latch 52 at the bottom end thereof, and an engaging member 53 is formed at the bottom end of the latch 52. The engaging member 53 becomes engaged with a striker (not shown) attached to a vehicle body so that a locked condition is maintained while the trunk lid 51 is closed. In order to increase the strength by which the latch 52 is fixed on an inner panel 54 of the trunk lid 51, a reinforcement member 55 is fixed to the inner panel 54 on a surface facing toward the outside of the vehicle.

A latch disengaging lever 56 is attached to the latch 52 in a rotatable manner, and a rod connected to a key cylinder (not shown) used for disengaging the lock of the trunk lid 51 is attached to the latch-disengaging lever 56 at an end thereof. The trunk lid 51 has a bent shape, and a license-plate receiving portion 58 is formed at a rear end 57 of the trunk lid 51. Attachment holes 59a and 59b which receive metal fittings for attaching a license plate and attachment holes 60a and 60b which receive metal fittings for attaching an illuminating device for the license plate are formed in the license-plate receiving portion 58.

Accessories such as the license plate are often attached to the trunk lid 51 of the vehicle. In such a case, there is a risk in that such accessories will be removed and the trunk lid 51 will be opened from outside of the vehicle by inserting a simple tool into one of the holes such as the holes 59a and 59b shown in FIG. 6 and operating the latch-disengaging lever 56. In addition, since there is a gap between the inner panel 54 and an outer panel 61 of the trunk lid 51 having a bent shape, sufficient rigidity may not be obtained.

SUMMARY OF THE INVENTION

In view of the above-described drawbacks, an object of the present invention is to provide a latch attachment structure which prevents a lock mechanism on a vehicle from being intentionally disengaged by a party from outside of the vehicle without a key.

In order to obtain the above described object, according to the present invention, a latch attachment structure for a trunk lid or a back door of a vehicle, the trunk lid or the back door having an inner panel and an outer panel, includes a latch for engaging with a striker fixed to a vehicle body and which is disposed at an end of the trunk lid or the back door; a reinforcement member with which the latch is attached to the trunk lid or the back door; a latch disengaging lever which is attached to the latch such that the latch disengaging lever is disposed between the inner panel and the outer panel; and a shield cover covers the latch disengaging lever. Accordingly, the latch disengaging lever is prevented from being operated by using a tool from the direction of the shield cover.

The above described construction of the present invention is further effective when an attachment hole for attaching an accessory is formed in the outer panel and the shield cover is disposed between the attachment hole and the latch disengaging lever. In such a case, even when the accessory is removed and a tool is inserted through the attachment hole, the latch disengaging member is prevented from being operated.

In addition, the shield cover may be formed by extending an end portion of the reinforcement member. In such a case, since an additional member is not necessary, costs are reduced. The reinforcement member may extend to the outer panel and the extending portion of the reinforcement member may be fixed to the outer panel. In such a case, the rigidity of the trunk lid or the back door is increased.

In addition, a right portion and a left portion of the reinforcement member may be extended so as to cover the right and left regions of the latch. In such a case, the latch disengaging member is also prevented from being operated from the right and left sides thereof. The right portion and the left portion of the reinforcement member may extend to the outer panel and a right end portion and a left end portion may be fixed to the outer panel. In such a case, the rigidity of the trunk lid is further increased.

An aspect of the present invention provides a latch attachment structure for a latch on a trunk lid or a back door of a vehicle, the trunk lid or the back door having an inner panel and an outer panel, the latch being provided on an end portion of the trunk lid or the back door to engage a striker fixed to the vehicle body, and the latch including a latch disengaging lever provided between the inner panel and the outer panel, the latch attachment structure including a reinforcement member configured to attach the latch to the trunk lid or the back door; and a shield configured to cover the latch disengaging lever. The outer panel may include an attachment hole for attaching an accessory to the trunk lid or the back door, and the shield may be positioned between the attachment hole and the latch disengaging lever. Further, the shield may extend from an end portion of the reinforcement member.

In a further aspect of the present invention, the reinforcement member may extend to the outer panel, and the reinforcement member may include an extending portion fixed to the outer panel. Further, the reinforcement member may include a right portion and a left portion, the right portion and the left portion extending from the reinforcement member and configured to cover right and left regions of the latch, respectively. The right portion and the left portion of the reinforcement member may extend to the outer panel, and a right end of the right portion and a left end of the left portion of the reinforcement member may be fixed to the outer panel. Further, the reinforcement member may be fixed to the inner panel and to the outer panel, extending therebetween; and the shield may extend from the reinforcement member toward the outer panel.

In another aspect of the present invention, the reinforcement member may be fixed to the inner panel, and the shield may extend into a gap between the inner panel and the outer panel. Further, the reinforcement member may include an upper portion, the upper portion extending from the reinforcement member and configured to cover an upper region of the latch.

A further aspect of the present invention provides a protection device for a latch on a vehicle closure, the closure having an inner panel and an outer panel, the latch being provided on an end portion of the closure to engage a striker fixed to the vehicle body, and the latch including a latch disengaging lever provided between the inner panel and the outer panel, the protection device including a shield configured to cover the latch disengaging lever. The closure may include a trunk lid or a back door. The outer panel may include an attachment hole for attaching an accessory to the closure, and the shield may be positioned between the attachment hole and the latch disengaging lever. Further, the shield may be fixed to the inner panel, extending from the inner panel toward the outer panel.

A further aspect of the present invention provides a combination including a vehicle body; a latch; and a latch attachment structure.

BRIEF DESCRIPTION OF THE DRAWINGS

The above and other objects, features and advantages of the present invention will be made apparent from the following description of the preferred embodiments, given as non-limiting examples, with reference to the accompanying drawings, in which.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

A latch attachment structure according to an embodiment of the present invention will be described below with reference to the accompanying drawings.

Figure 1:
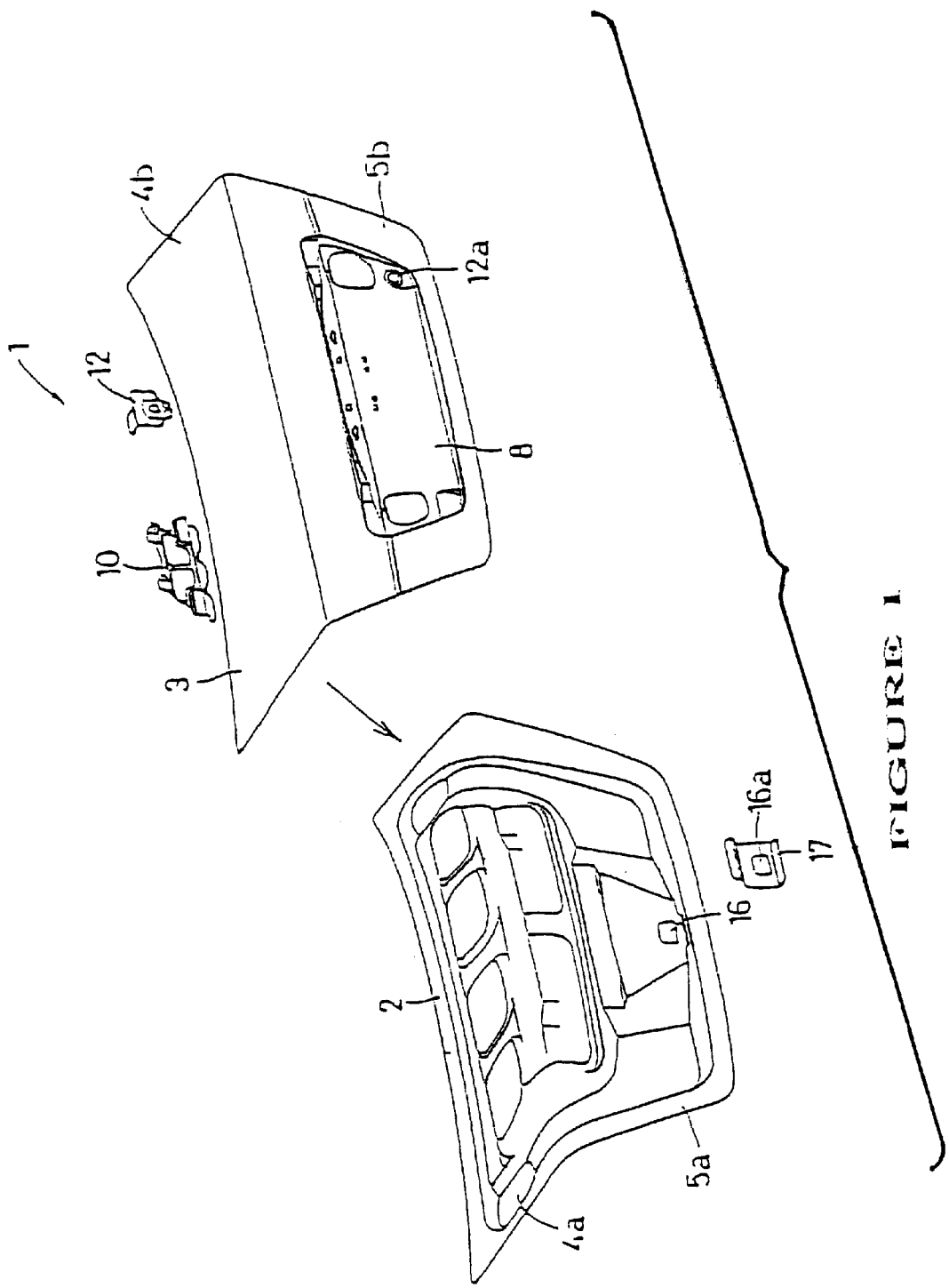
FIG. 1 is an exploded perspective view of a trunk lid incorporating a latch attachment structure according to an embodiment of the present invention.

FIG. 1 is an exploded perspective view of a trunk lid 1, which is a component of a trunk of a vehicle. As shown in the figure, the trunk lid 1 includes an inner panel 2 and an outer panel 3, both of which have a bent shape in cross section cut along the longitudinal or forward/rearward direction of the vehicle. The inner panel 2 and the outer panel 3 are positioned such that the inner panel 2 faces toward the vehicle cabin and the outer panel 3 faces toward the outside of the vehicle. The inner panel 2 includes a horizontal portion 4a and a vertical portion 5a. The vertical portion 5a is at the rear end of the vehicle, and an attachment unit for a latch 6 shown in FIGS. 2 and 3 is provided at the center of a bottom end portion of the vertical portion 5a.

The outer panel 3 also has a horizontal portion 4b and a vertical portion 5b, and a license-plate receiving portion 8 which receives a license plate 7 (see FIG. 3) is formed in the vertical portion 5b such that the license-plate receiving portion 8 is recessed toward the front of the vehicle. Attachment holes 9a and 9b used for attaching the license plate 7 are formed at the upper side of the license-plate receiving portion 8, and a bracket 10 for attaching the license plate 7 is fixed to the attachment holes 9a and 9b at the inner side of the outer panel 3. In addition, attachment holes 11a and 11b used for attaching an illuminating lamp for the license plate 7 are also formed in the license-plate receiving portion 8 at positions above the attachment holes 9a and 9b. In addition, an attachment hole 12a used for attaching a key cylinder is formed in the license-plate receiving portion 8 at the lower right position thereof, and a bracket 12 for attaching the key cylinder is fixed to the attachment hole 12a.

Figure 2:
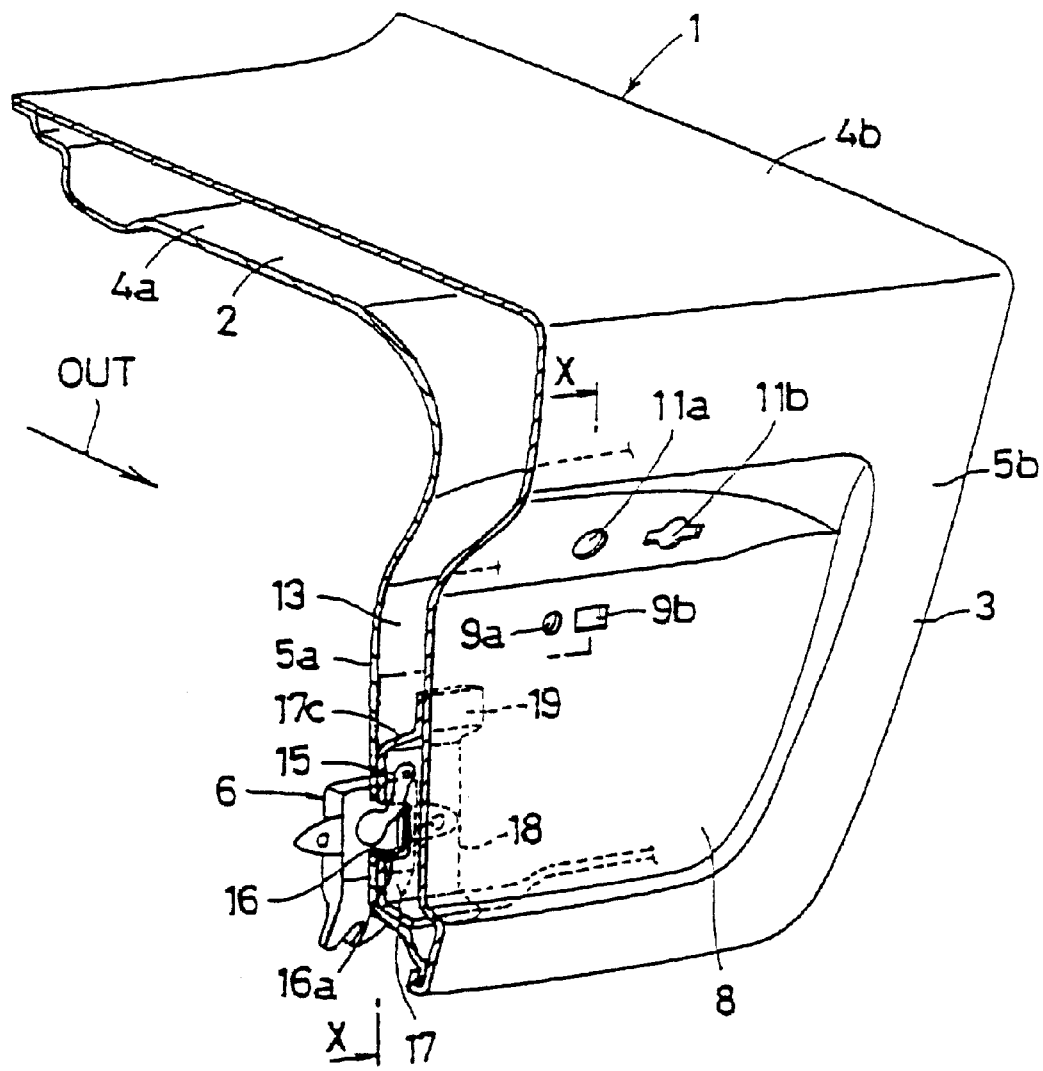
FIG. 2 is a perspective view of the trunk lid shown in FIG. 1 which is partially cut away at a portion at which a latch is attached.
Figure 3:
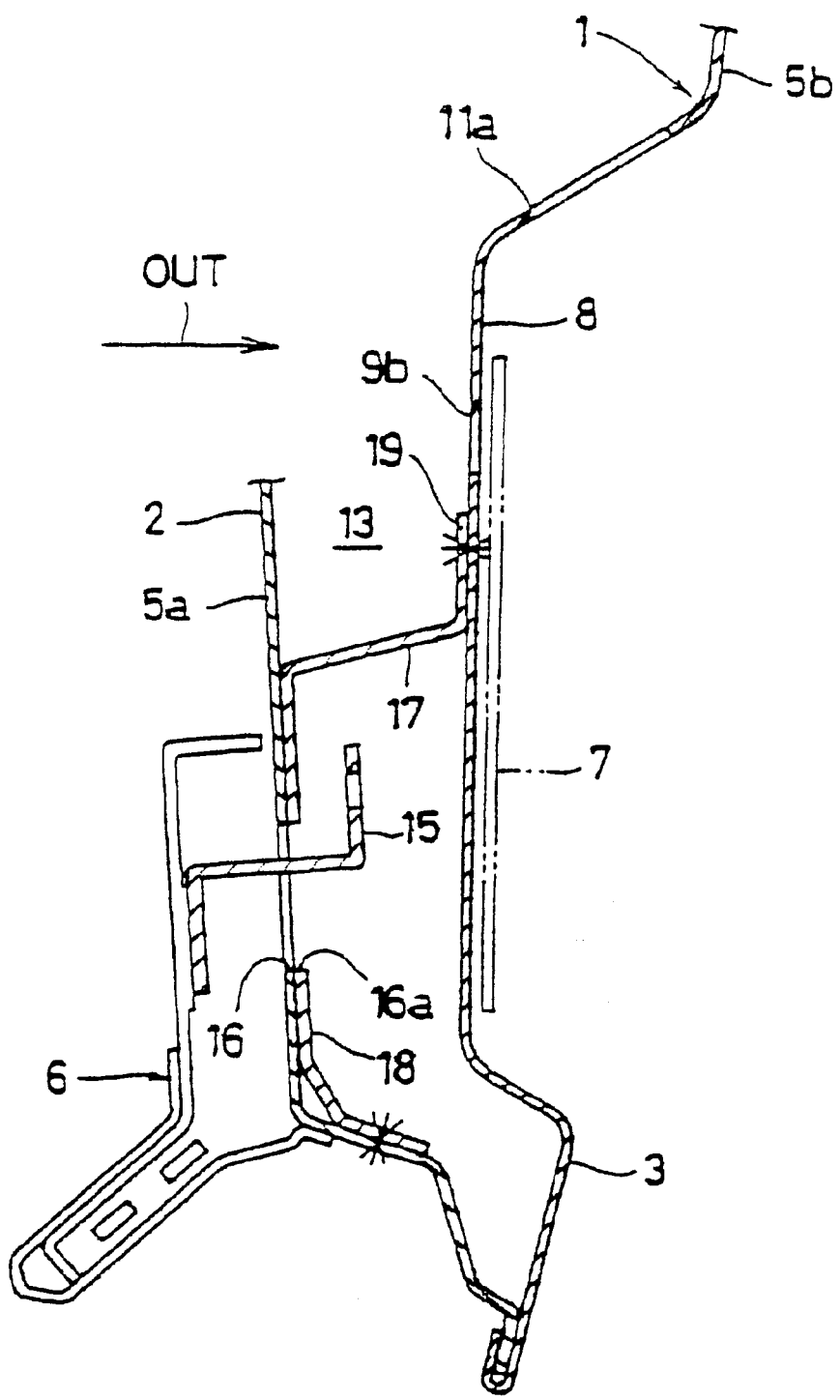
FIG. 3 is a sectional view of FIG. 2 taken along line X—X.
Figure 4:
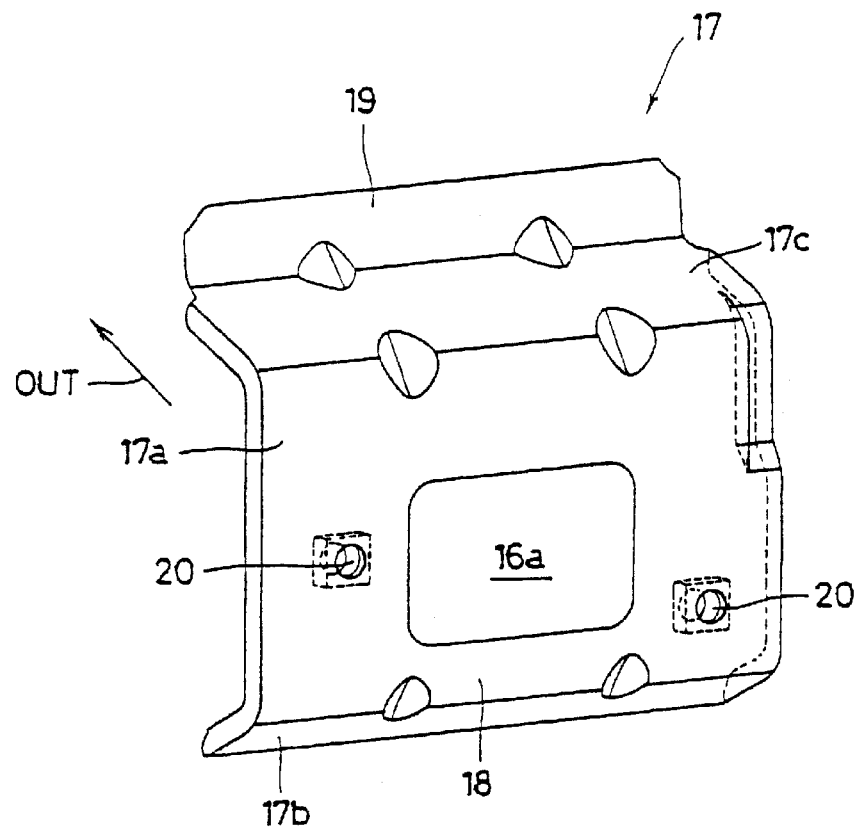
FIG. 4 is a perspective view of a reinforcement member having an extending portion which covers the upper region of a latch disengaging lever of the latch shown in FIG. 2.

As shown in FIGS. 2 and 3, a gap 13 is formed between the inner panel 2 and the outer panel 3, and a reinforcement member 17 is provided at the outer side of the inner panel 2 at a position corresponding to the attachment unit of the latch 6. As shown in FIG. 4, the reinforcement member 17 includes an attachment portion 18 which is provided with a flat portion 17a having a shape corresponding to the inner panel 2 and an inclined portion 17b formed at the lower side of the flat portion 17a. The attachment portion 18 is provided with an opening 16a at the central region thereof and may be fixed to the inner panel 2 at regions around the opening 16a by any suitable fixing mechanism such as, for example, by soldering. In addition, an extending portion 17c extends at an angle from the upper end of the flat portion 17a toward the outer panel 3, and a flange shaped attachment portion 19 extends upward from the rear end of the extending portion 17c. The flange shaped attachment portion 19 may be fixed to the inner surface of the outer panel 3 by any suitable fixing mechanism such as, for example, by soldering at a position behind the license plate 7.

The latch 6 is provided at the inner side of the inner panel 2 of the trunk lid 1 and may be attached to the inner panel 2 by using a pair of fixing nuts 20 formed in the flat portion 17a of the reinforcement member 17. A latch disengaging lever 15 is attached to the latch 6 at the outer side thereof in a rotatable manner, and an opening 16 is formed in the inner panel 2 at a position corresponding to the latch-disengaging lever 15. An end portion of the latch disengaging lever 15 extends through the opening 16 and the opening 16a formed in the reinforcement member 17, which is positioned such that the openings 16 and 16a overlap each other. Accordingly, the latch disengaging lever 15 projects into the gap 13 between the inner panel 2 and the outer panel 3. The reinforcement member 17 is positioned such that the extending portion 17c is placed directly above the latch disengaging lever 15. Accordingly, the extending portion 17c is positioned so as to extend in a position between the latch disengaging lever 15 and the attachment holes 9a and 9b and the attachment holes 11a and 11b. Thereby, the extending portion 17c provides a shield between the latch disengaging lever 15 and attachment holes 9a, 9b, 11a, and 11b.

According to the above described construction, even if the license plate 7 were intentionally removed and a tool inserted through one of the attachment holes 9a and 9b (used, e.g., for attaching the license plate 7), the extending portion 17c of the reinforcement member 17 lies between the latch disengaging lever 15 and the attachment holes 9a and 9b. Therefore, the latch disengaging lever 15 cannot be reached by a tool, and a party who does not have a key for the trunk lid 1 cannot open the trunk lid 1. Similarly, if a tool is inserted through one of the attachment holes 11a and 11b, the reinforcement member 17 shields the latch disengaging lever 15, and the latch disengaging lever 15 cannot be operated so that the lock of the trunk lid 1 cannot be disengaged.

In addition, although the reinforcement member is fixed only to the inner panel according to the prior art, in the present embodiment, the reinforcement member 17 extends to the outer panel 3 and is fixed to both the inner panel 2 and the outer panel 3 by any suitable fixing device, such as, for example, by soldering. Accordingly, an advantage is obtained in that the rigidity between the inner panel 2 and the outer panel 3 is increased. Further, another advantage is obtained since the reinforcement member 17 is soldered on the outer panel 3 at a position behind the license plate 7, the appearance of the trunk lid 1 is not degraded.

Although an embodiment of the present invention is explained in detail in the foregoing descriptions, the present invention is of course not limited to this, and various modifications are possible within the technical scope of the present invention.

Figure 5:
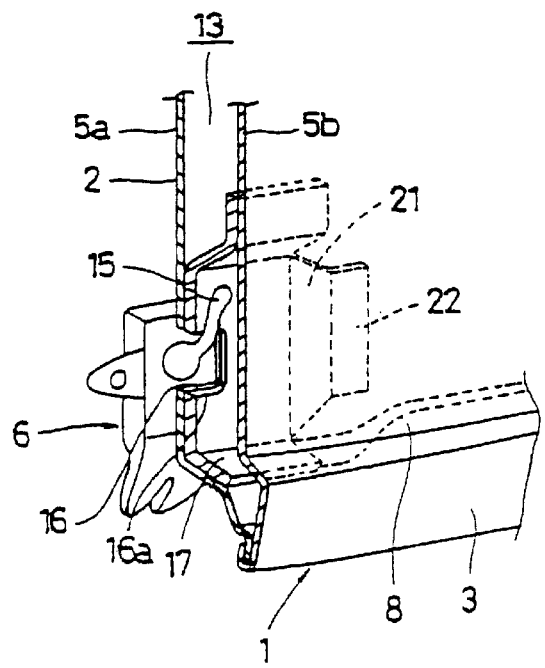
FIG. 5 is a perspective view of a latch attachment structure according to a second embodiment of the present invention.
Figure 6:
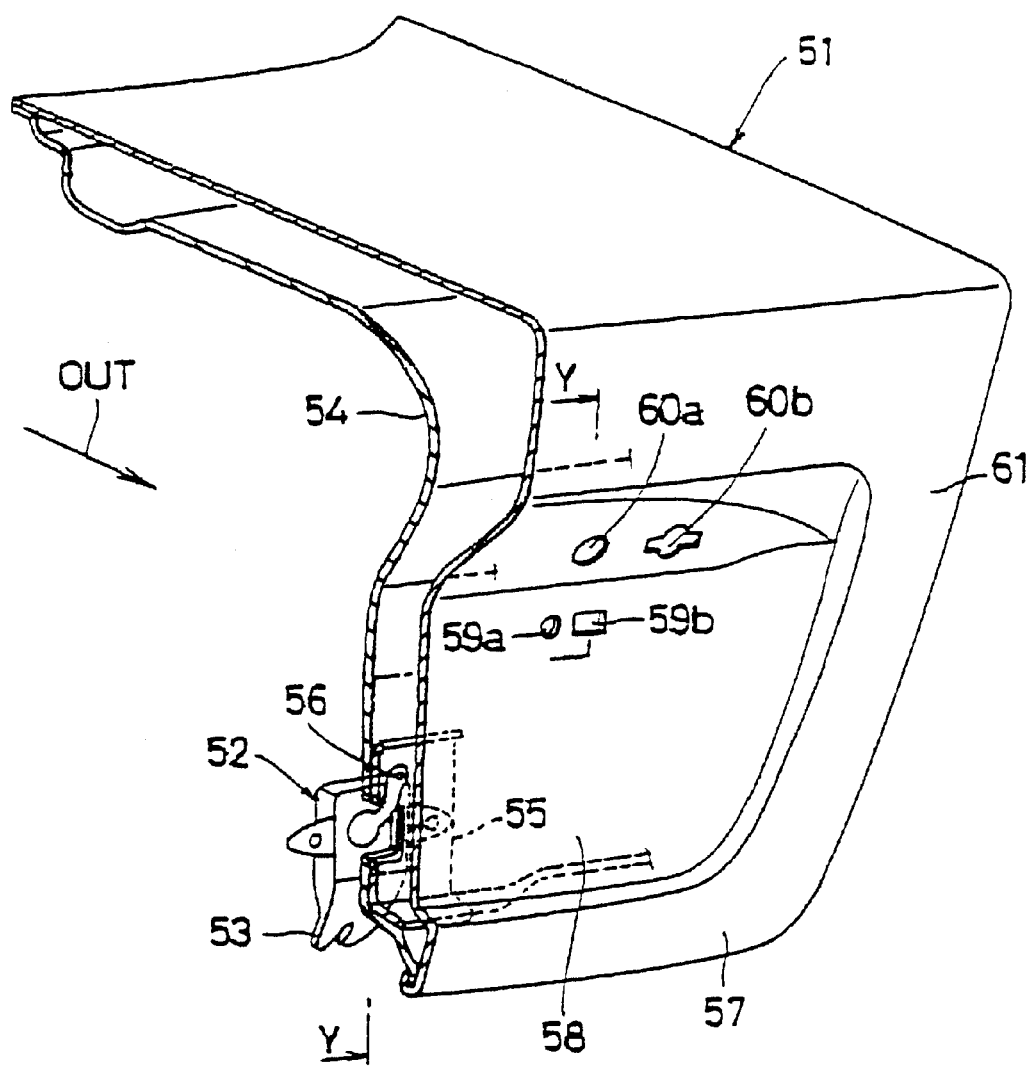
FIG. 6 is a perspective view of a trunk lid of the known art which is partially cut away at a portion at which a latch is attached.
Figure 7:
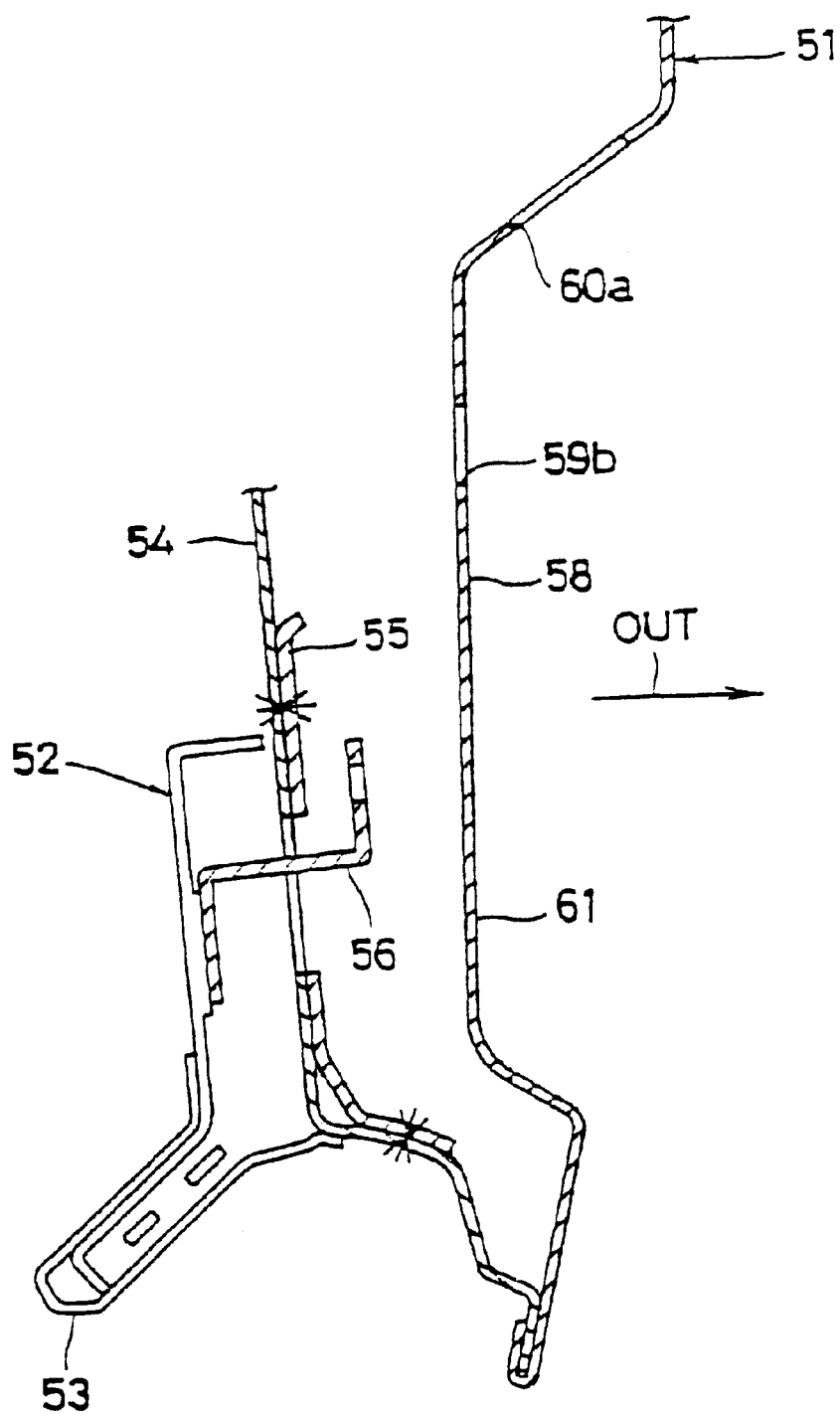
FIG. 7 is a sectional view of FIG. 6 taken along line Y—Y.

For example, in the above-described embodiment, the reinforcement member 17 extends only in the upward direction relative to the latch-disengaging lever 15. However, as shown in FIG. 5 in another embodiment of the present invention, another extending portion 21 which extends from the inner panel 2 to the outer panel 3 and an attachment portion 22, which may be soldered on the outer panel 3, may be provided at one or both sides of the reinforcement member 17 in the width direction of the vehicle. In such a case, the latch disengaging lever 15 is even more reliably protected and prevented from being operated by a tool inserted from the outside. Furthermore, the reinforcement member 17 may be constructed such that the entire body of the latch disengaging lever 15 is covered by the reinforcement member 17 except for a portion at which the latch disengaging lever 15 is attached to a rod which connects the latch disengaging lever 15 and the key cylinder. In such a case, the rigidity of the trunk lid 1 is further increased. In addition, only the extending portion 17c may be provided and the attachment portion 19 may be omitted, although the rigidity of the trunk lid I will be increased to a lesser extent in such a case.

In addition, although the trunk lid 1 is described as an example in the present embodiment, a similar construction may also be used in a back door of a vehicle.

Although the invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

The present disclosure relates to subject matter contained in priority Japanese Application No. 2001-314650, filed on Oct. 12, 2001, which is herein expressly incorporated by reference in its entirety.

What is claimed is:

1. A latch attachment structure for a latch on a trunk lid or a back door of a vehicle, the trunk lid or the back door having an inner panel and an outer panel, the latch being provided on an end portion of the trunk lid or the back door to engage a striker fixed to the vehicle body, and the latch including a latch disengaging lever provided between the inner panel and the outer panel, said latch attachment structure comprising:

a reinforcement member configured to attach the latch to the trunk lid or the back door, said reinforcement member extending between the inner panel and the outer panel, said reinforcement member including a first attachment portion provided on a first end portion of said reinforcement member and fixed to the inner panel and a second end portion opposite said first end portion and said first attachment portion; and a shield configured to cover the latch disengaging lever, said shield extending from said second end portion of said reinforcement member to the outer panel and including a second attachment portion provided on an end portion of said shield and fixed to the outer panel.

2. The latch attachment structure according to claim 1, wherein the outer panel includes an attachment hole for attaching an accessory to the trunk lid or the back door, and said shield is positioned between the attachment hole and the latch disengaging lever.

3. The latch attachment structure according to claim 1, wherein said reinforcement member extends to the outer panel, and said reinforcement member includes an extending portion fixed to the outer panel.

4. The latch attachment structure according to claim 1, wherein said reinforcement member includes a right portion and a left portion, said right portion and said left portion extending from said reinforcement member and configured to cover right and left regions of the latch, respectively.

5. The latch attachment structure according to claim 4, wherein said right portion and said left portion of said reinforcement member extend to the outer panel, and a right end of said right portion and a left end of said left portion of said reinforcement member are fixed to the outer panel.

6. The latch attachment structure according to claim 1, wherein said shield extends into a gap between the inner panel and the outer panel.

7. The latch attachment structure according to claim 1, wherein said reinforcement member includes an upper portion, said upper portion extending from said reinforcement member and configured to cover an upper region of the latch.

8. The latch attachment structure according to claim 1, wherein said second attachment portion of said shield comprises a flange shaped member, said flange shaped member fixed to an inner surface of the outer panel.

9. The latch attachment structure according to claim 8, wherein the outer panel includes a license plate receiving portion, said flange shaped member soldered to the inner surface of the outer panel adjacent the license plate receiving portion.

10. A protection device for a latch on a vehicle closure, the closure having an inner panel and an outer panel, the latch being provided on an end portion of the closure to engage a striker fixed to the vehicle body, and the latch including a latch disengaging lever provided between the inner panel and the outer panel, said protection device comprising:

a shield configured to cover the latch disengaging lever, said shield extending between the inner panel and the outer panel, said shield including a first attachment portion provided on a first end portion of said shield and fixed to the inner panel, said shield extending from said first end portion and said first attachment portion to the outer panel and including a second attachment portion provided on a second end portion of said shield opposite said first attachment portion and fixed to the outer panel.

11. The protection device according to claim 10, wherein the vehicle closure comprises a trunk lid.

12. The protection device according to claim 10, wherein the vehicle closure comprises a back door.

13. The protection device according to claim 10, wherein the outer panel includes an attachment hole for attaching an accessory to the closure, and said shield is positioned between the attachment hole and the latch disengaging lever.

14. In combination, a vehicle body;

a latch; and a latch attachment structure according to claim 1.

* * * * *